United States Patent
Ryan et al.

(10) Patent No.: US 7,774,256 B1
(45) Date of Patent: Aug. 10, 2010

(54) SYSTEM AND METHOD TO MINIMIZE ACCOUNTING VOLATILITY FROM OWNING EQUITIES AND OTHER INVESTMENT ASSETS

(75) Inventors: Raymond B Ryan, Darien, CT (US); Wendy J. Engel, 12 Princess Pine Rd., Norwalk, CT (US) 06850

(73) Assignee: Wendy J. Engel, Norwalk, CT (US)

( * ) Notice: Subject to any disclaimer, the term of this patent is extended or adjusted under 35 U.S.C. 154(b) by 1991 days.

(21) Appl. No.: 10/375,770

(22) Filed: Feb. 27, 2003

Related U.S. Application Data

(60) Provisional application No. 60/361,450, filed on Feb. 28, 2002.

(51) Int. Cl.
  *G06Q 40/00* (2006.01)
(52) U.S. Cl. .......................................... 705/36; 705/35
(58) Field of Classification Search .............. 705/35–45
  See application file for complete search history.

(56) References Cited

U.S. PATENT DOCUMENTS

| | | | | |
|---|---|---|---|---|
| 5,761,442 A | * | 6/1998 | Barr et al. ................. | 705/36 R |
| 5,784,696 A | * | 7/1998 | Melnikoff .................. | 705/36 R |
| 5,999,918 A | * | 12/1999 | Williams et al. .......... | 705/36 R |
| 6,049,772 A | * | 4/2000 | Payne et al. .................... | 705/4 |
| 6,282,520 B1 | * | 8/2001 | Schirripa .................. | 705/36 R |
| 6,304,859 B1 | * | 10/2001 | Ryan et al. ..................... | 705/38 |
| 6,456,979 B1 | * | 9/2002 | Flagg ............................ | 705/4 |
| 2002/0128810 A1 | * | 9/2002 | Craig et al. ................... | 703/17 |
| 2002/0184133 A1 | * | 12/2002 | Zangari et al. ............... | 705/36 |
| 2002/0198802 A1 | * | 12/2002 | Koresko ....................... | 705/35 |
| 2007/0156558 A1 | * | 7/2007 | Wolzenski et al. ............ | 705/35 |

OTHER PUBLICATIONS

Life Insurance Modified Endowments by DesRochers, Adney, Hertz and King.*

* cited by examiner

*Primary Examiner*—Rajesh Khattar
(74) *Attorney, Agent, or Firm*—Peter K. Trzyna, Esq.

(57) ABSTRACT

A system computing performance statistics for an investment fund or similar investment vehicle, computing a minimum investment performance corridor guarantee provided by an underwriter, and computing the amount of reimbursement due, if any, from an underwriter if the investment is liquidated at a point in time. Also, the system accepts hypothetical data with respect to investment performance and underwriter terms. The system then illustrates underwriter risk exposure and potential investor reimbursements under different fact combinations.

28 Claims, 2 Drawing Sheets

SYSTEM AND METHOD TO MINIMIZE ACCOUNTING VOLATILITY FROM OWNING EQUITIES AND OTHER INVESTMENT ASSETS

This patent application claims benefit from, and incorporates by reference, U.S. Patent Application Ser. No. 60/361,450, filed by the same inventors and with the same title on 28 Feb. 2002.

I. BACKGROUND INFORMATION

There is a highly developed market where banks purchase life insurance to pre-fund future employee benefit expenses. These banks make use of variable life insurance contracts with separate accounts that hold debt instruments. Generally, banks are prohibited from owning securities classified as equities. Also, it is widely believed that this prohibition applies to assets held by a variable life contract, which is owned by a bank. Of course, as market interest rates fluctuate, the underlying market value of the separate account debt instruments goes up and down. Under GAAP (see FASB Technical Bulletin (TB) 85-4), the policy is accounted for on a mark-to-market basis. Seeking to avoid earnings volatility from their life insurance purchases, banks have bought Stable Value Wraps (SVWs) inside their separate accounts. For all intents and purposes, the SVWs promise that the debt security will earn a set rate of return—which will be reflected in the principal of the debt instrument. Upon surrender of the policy, the owner will receive the amount of principal reflected in the SVW promise—nothing more or less. As a result, earnings are stable and predicable even if market interest rates fluctuate widely and the underlying policy cash surrender value goes up and down.

The parties writing the SVWs are typically not the carrier issuing the life contract or the party managing the investment. The "writers" are either banks or insurance companies that are familiar with sophisticated derivative transactions.

Recently, other industries have become interested in using variable life insurance to pre-fund employee benefits. Typically, in other businesses, there is no regulatory prohibition to owning equities inside of a variable life policy. Notwithstanding, prospective policy buyers are anxious to avoid the exposure to mark-to-market accounting in years when the investments are under-performing expectations. Writers of SVW contracts have been reluctant to offer contracts when the separate account securities are equities instead of debt. The proposed fees for equity SVWs have been so high as to be unattractive to the market. Accordingly, we have discovered a need to invent a new approach to dampen the earnings volatility from owning equities for benefit funding purposes. We have observed a need for a new approach that will apply most often to equities and equity-like instruments held inside a separate account of a life policy. Also, we have observed that there is a need for a new approach that is equally applicable where assets are held directly by a company and accounted for using mark-to-market (e.g., tracking securities under SFAS No. 115).

II. BRIEF DESCRIPTION OF DRAWINGS

III. SUMMARY

Figure 1:
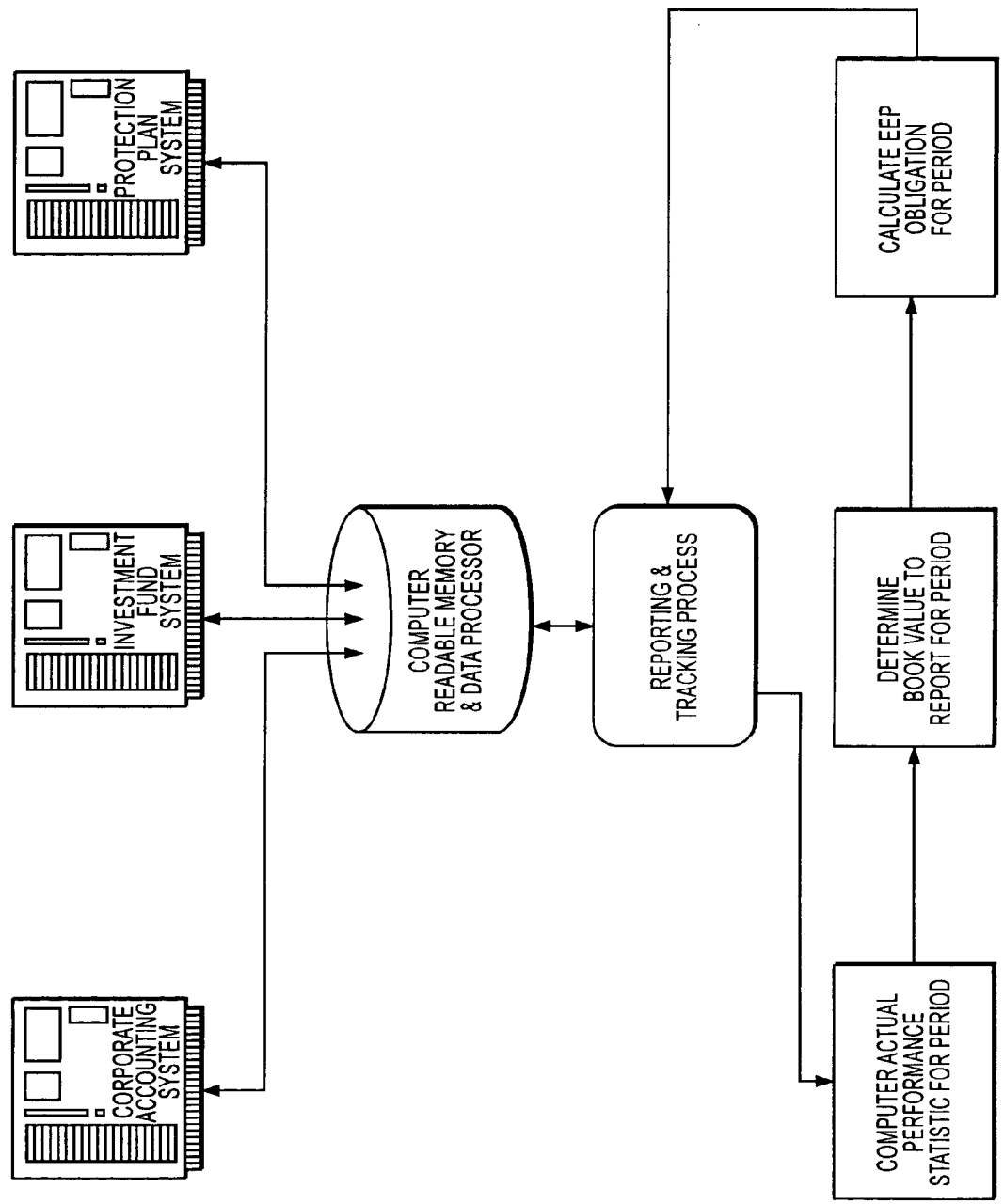
FIG. 1 is a summary flow chart of the operation of the Engel Protection Plan system.

Accordingly, we have devised a plan, termed the Engel Protection Plan ("EPP"), to provide a significant reduction of income accounting volatility due to a corporate holding of equities with respect to a benefit funding program. Further, the cost to the policy owner is at an affordable price. The EPP has given rise to a need to operate the EPP effectively, which has led to the invention of a complex and sophisticated computer system, (see, generally, e.g., FIG. 1). To fully appreciate the advances made in this computer system requires a brief explanation of EPP. However, the principles of the present invention are applicable to more than one embodiment and other situations than the fact pattern described herein. The EPP makes possible the use of equity, equity-like instruments, and other potentially volatile investments for funding where investors have a low tolerance for substandard or negative earnings in a reporting period. Examples of these type of investment instruments include variable life insurance contracts, regulated investment companies (ie mutual funds, SPDR®s, etc.) publicly traded partnerships and other investment companies whose shares have a readily ascertainable market value. Typically, the investors holding the above investment instruments are required to account for their assets on a mark-to-market basis.

Unlike the SVW for bank-owned life insurance, EPP makes no attempt to guarantee a given rate of return on the subject investment. Instead, the EPP uses the historical financial performance information of the fund to compute the statistical mean and annual standard deviation. For a reporting period (e.g., monthly, quarterly, annual), the EPP system compares the actual earnings realized with the historical mean and standard deviation. Under the normal EPP agreement, if actual earnings are between one and two standard deviations below the expected mean, then the agreement obligates the writer of the EPP contract to make up the difference in investment value between one standard deviation below the mean and the actual return. Note that the writer of the EPP contract is not required to make any payment to the policy separate account at the end of each accounting computation and reporting period. Instead, the contract writer is obligated to make a payment in the event that the fund is sold or otherwise liquidated. Accordingly, for variable life insurance contracts accounted for under TB 85-4, the policy owner records the EPP obligation the same as cash value and, as a result, it is part of the GAAP earnings of the policy owner.

This process may be best understood with a simple example. Assume $1,000 of cash value in a life insurance contract separate account holding a fund of hedge funds. The mean return for the fund is 13% and the standard deviation is 6%. Accordingly, the second standard deviation below the mean return ranges from 7% to 1%. Accordingly, in our example, the EPP program says that the policy owner will be able to report a 7% return even if actual income was only 1%, i.e., the lower limit of the second standard deviation. In other words, the EPP contract guarantee in our example is $1,070 of cash value at the end of the year. If actual returns are 1%, then actual assets are $1,010. The writer of the EPP contract will have an obligation of $60 in the event the policy owner surrenders the policy. Because of this EPP obligation, the policy owner can carry a policy cash value of $1,070 on its GAAP balance sheet under TB 85-4.

Under the EPP structure, normally there is a cap or maximum exposure that the program writer has to assume. Once the actual returns fall below two standard deviations of the mean return (e.g., below 1%), the EPP coverage cannot take the rate of return back to one standard deviation below the mean (e.g., 7%). Instead, a fixed percentage rate of return will be added to the actual rate of return. Again, assuming that the actual return is −5% and the fixed percentage adjustment is equal to one standard deviation or 6%, then the book return is 1%. The policy cash value for GAAP is $1,010. This amount equals the actual investment value of $950 plus the EPP writer's obligation of $60.

Figure 2:
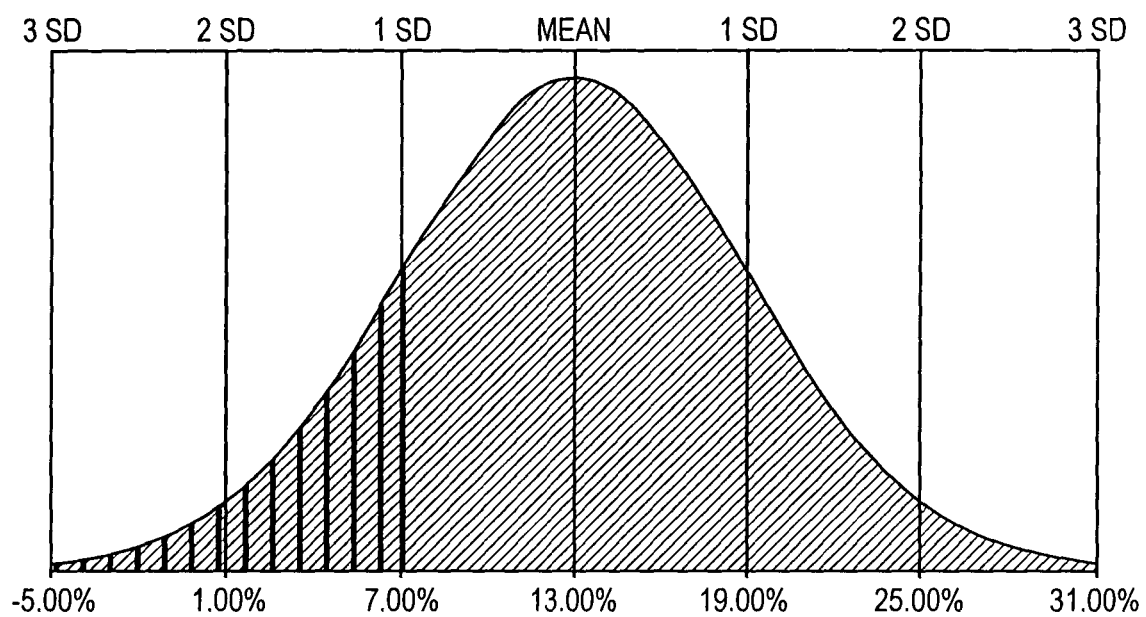
FIG. 2 is a graph of a "normal" curve showing protection area.

FIG. 2 is a graph of the "normal" curve of the example discussed above. Note the protection areas with bar shading where returns are less than one standard deviation below the mean.

EPP Program Embodiments. Under the EPP plan, there are a variety of embodiments and methods which modify the risk transfer in the program and thereby decrease (or increase) the EPP fee to the owner of the investment. Of course, each cost reduction (or increase) requires that the contract owner assume a greater (or lesser) proportion of the risk of sub par performance and the writer of the EPP contract assumes a lesser (or greater) proportion of the risk.

Based on the above example, the expectation is that over time the internal rate of return of the investment will be close to 13%. If the actual returns are more than one standard deviation below the mean (i.e., below 7%), then the EPP writer incurs an obligation to the 10 investment account. Of course, if the internal rate of return of the investment is 7% or greater over a series of years, there still can be years when returns are less than 7%. The year a substandard performance occurs (e.g., a 1% return), an obligation under the EPP contract can arise in that year.

A highly remote but potentially large dollar risk to the EPP contract writer is that the covered investment will consistently under-perform the one standard deviation threshold. For example, this would be the case where in the first ten years the investment returns were, say, 4% per annum. In this scenario, each year the EPP program adds 3% of last year's investment actual value and 7% of the EPP obligation to the accumulated EPP obligation. Because the returns never exceed one standard deviation (e.g., 7%), the EPP obligation will continue to increase in this hypothetical situation.

Accordingly, the writer of an EPP contract will typically want to limit the magnitude of its obligation under the contract. That limit can be a designated fixed amount. Still, most users will prefer a formula driven limitation. A simple formula limit could be last year's actual investment value times a percentage amount (e.g., 15%). Alternatively, the limit could be a percentage of last year's EPP guarantee amount. Today, the latter is the preferred approach. Of course, it is possible to write a contract such that the guarantee percentage limit varies from year to year. For example, in year one the percentage might start at 5% and increase 1% per year until the amount reaches, say, 15%. The system is designed to include this risk limitation feature.

There is another method (alternate embodiment) of limiting risk transfer from the EPP contract writer to the owner of the investment fund. The EPP contract can phase in the maximum amount of percentage points to be added to the actual return. For example, in the first year that maximum could be 3%. To continue our example, if actual returns are 2%, the guarantee return is 5%. If actual returns equal 6%, our guarantee return will still be limited to 7%, or one standard deviation below the mean in the hypothetical example.

IV. DETAILED DISCUSSION OF A PREFERRED EMBODIMENT

The present invention is a computer-supported system and method to portray and to administer a sophisticated method to enable a corporation to minimize or handle any material negative effect on earnings from a volatile investment in equity and equity-like instruments. Investments suitable for this invention will have historical rates of return from which it is possible to compute a mean (or other type of average) return and a standard deviation from the mean (or similar statistical measure of volatility). Often, these investments will be held in variable life insurance policy separate accounts. The invention allows the investment returns that fall below a specific measure away from the expected mean to be recorded at that specific measure of return. The income reporting protection is truncated. Once actual returns fall below a second and lower rate of return level, the income reporting protection itself becomes limited to a fixed upward adjustment. Via this approach, the income reporting protection is significant in as much as it covers the instances where a substandard rate of return is most likely to occur. Once returns fall into the realm of unlikely and unattractive, some accounting protection will be available. Said differently, when a low probability negative event occurs (e.g., an investment loss), the EPP protection is limited and so too is the writer's exposure under the EPP contract. Depending on how low actual returns fall, the adjusted book accounting returns could be much less than the target minimum rate of return.

The present invention involves a system including four processes, namely: 1) computing the actual rate of return and other performance statistics of the investment; 2) determining the investment book value to be recorded under the EPP contract; 3) calculating the amount of the EPP obligation that exists at the end of each reporting period; and 4) reporting and tracking the values set forth above. As used herein, "system" can refer to components, such as a particular computer, as well as some portion of the totality represented in FIG. 1, though particular meaning can be provided by the context of the usage.)

The system can use at least two types of information: 1) information related to the investment and 2) information describing the terms of the plan. Investment information itself falls into at least two categories. First, there is the historical information about the investment fund's performance prior to the implementation of the EPP plan. This information is used to compute the rate of return statistical standards created in the EPP program. These values (e.g., mean and standard deviation) are included in a formula computing the periodic EPP obligations, if any. Second, the system creates investment performance information using post plan implementation investment performance data. Such data includes rate-of-return values (e.g., mean and standard deviations) when computing that period's EPP obligation, if any.

Information regarding terms of the plan is used in the formula that reflects the logic of the particular EPP contractual arrangement. Further, additional information can include the percentage that is applied to computed assets to establish an overall limitation as to the amount of loss protection permitted by the plan. Also, additional information can include a formula to gradually increase the amount of protection in the first few years until it reaches a maximum established by the EPP contract.

Once the information is on the system, the data can be accessed to complete the necessary processes that make up this invention.

Computing Actual Performance Statistics. The present invention communicates with a fund manager's computer system to obtain the values that affect the rates of return of an investment: the beginning period amount, additional contributions during the period, distributions during the period, and the end of the period amount. With these fund flows and values, the system can compute a rate of return for the period. Also, using the historical data on the fund in the data, it is possible to compute a rate of return for the fund that includes the historical period. Also, the system can generate standard deviation or other volatility statistics that are updated through the most current reporting period.

Determining EPP Obligation & Limits. For each reporting period, the present system must use the data stored in the system and the information computed for the reporting period to determine what, if any, obligation is created by the writer of the EPP contract to the owner of the investment fund. That obligation is accounted for under GAAP as additional investment value on the books of the fund owner.

When subject to an EPP contract, an investment does not trigger an obligation amount unless the actual return falls below a minimum level (e.g., one standard deviation below the mean). Accordingly, the starting point for this computation is the actual rate of return and the investment asset values determined above. If the actual return falls in a corridor (e.g., between one and two standard deviations below the mean), the system designates a contractual minimum return (e.g., one standard deviation below the mean) as the rate of return for the period. Still, if the returns are less than a pre-designated amount (e.g., two standard deviations below the mean) the actual rate of return is increased by a formula amount. Using this rate of return multiplied by last year's GAAP book value, the system computes a target asset value. If the target asset value is less than the actual asset value, then the actual asset value is the value to be used by the owner of the investment fund. There is no obligation incurred by the writer of the EPP contract under this scenario.

Where the target asset value exceeds the actual value of the investment, the EPP contract triggers an obligation of the writer of the EPP contract. Under one system design, the obligation amount can simply be the difference between the target and actual values as computed by the system. Still, most writers of an EPP contract can elect to place a limit on their potential obligation to an investor. This limit is computed by the system (e.g., 10% of last period's guarantee value plus the end of the period actual asset value) and compared to the target asset value to determine the lesser of the two. The system labels the lesser amount as the book value for the period.

The EPP Obligation. The writer of the EPP contract will want to have an accurate determination of the EPP obligation for each reporting period. The system computes the EPP obligation to be the greater of zero and the book value of the investment less the actual value of the investment. The values necessary for the EPP obligation computation are derived above.

Reporting and Storing. The invented system has the capacity to deliver the values derived above via an electronic computer-to-computer communications mechanism, such as, for example, a modem, to the owner of the investment fund and to the writer of the EPP contract. Of course, the system users can determine the extent of the data to provide and if any third parties are to receive distributions. Further, the system stores the computed data for inclusion in future reports and computations.

Prior to the present invention, no known system existed that would enable a writer of an accounting "hedge" contract for an investment fund (with some type of equities) to limit the writer's downside risk and, at the same time, provide the owner of the investment with a reasonable minimum rate of return to be reported under the contract. Such accounting "hedge" contracts written for equities followed the format created in the market for debt instruments—guaranteeing some target rate of return. These early attempts proved very expensive and exposed the writer to a high degree of risk in a volatile equity market.

The EPP program creates a corridor of risk for the EPP writer that can be easily quantified by the current system. The system enables the EPP writer to analyze the risk and perform sensitivity testing prior to executing a contract as well as compute and track the EPP contract obligation once a plan is in place. Where the contract provides for a maximum obligation formula, the writer is also able to know its maximum exposure under the contract. As a result, the system enables the contract writer to have better information to price the cost of the contract coverage.

From the point of view of the owner of the investment, there is no limitation on the upside of income that it can report from the investment. When the investment is under performing, there is a minimum return that it will be able to report in each period. Of course, if actual income falls below some pre-set floor, then the book return can be less than the EPP target contract minimum. From a statistical point of view, the probabilities are high that the investment owner will always be able to report the contract target minimum return or higher.

In sum, then, the invention can be viewed as a computer-implemented method for calculating the mean rate of return of an investment from a group consisting of a regulated investment company, a public partnership, a hedge fund, or any combination thereof, for example, a mutual fund or similar investment instrument. The computer-implemented method is also for calculating the standard deviations of that return and updating the mean rate of return and standard deviations of return through time.

With a calculated mean rate of return and its standard deviations, the computer can compute the amount of a obligation due under a rate of return guarantee contract where the actual return falls between pre-determined standard deviations of return below the mean and are subject to certain contractual maximums through time.

Via computer-to-computer connections/communication, the computer can report the calculated mean and standard deviations of return to the investment fund manager, to the fund owner and buyer of the guarantee contract, and to the underwriter of the guarantee contract.

Also via computer-to-computer connections/communication, the computer can report the contract guarantee amount, if any, to the fund owner and buyer of the guarantee contract and to the underwriter of the guarantee contract.

Of course other embodiments, and other computer systems designed to compute and/or use return guarantees between a range of two returns set below an average or target return rate and then determine the amount of reimbursement due pursuant to a return guarantee contract, are included. With such a programmed computer system, the computer can illustrate the contractual guarantee amount under a variety of assumed contract terms and investment performances.

Additionally, via computer-to-computer connections/communications, the computer can receive scenario assumptions to illustrate and provide illustrations to underwriters (or others) for analysis of the risk exposure and protection afforded by hypothetical minimum rate guarantee terms.

While a particular embodiment of the present invention has been disclosed, it is to be understood that various different modifications are possible and are within the true spirit of the invention, the scope of which is to be determined with reference to the claims set forth below. For example, the present invention includes not only the method of using the system, but also the method of making it and the apparatus or system itself, along with necessary intermediates, especially of the data, and products such as output documents produced thereby. There is no intention, therefore, to limit the invention to the exact disclosure presented herein as a teaching of one embodiment of the invention.

We claim:

1. A method of using an apparatus, the method including the steps of:
   characterizing an ownership interest in an investment from a group consisting of a variable life insurance policy, a regulated investment company, a publicly traded partnership, a hedge fund, an investment company, and any combination thereof, and an average rate of return for the ownership interest in the investment and corresponding statistical measure of volatility of the return, as input to a computer;
   calculating, by said computer using said average rate of return and said corresponding statistical measure of volatility, a target rate and a fixed upward adjustment rate, as specified under a contractual agreement;
   calculating, by said computer using said target rate of return and, in the event that an actual rate of return is less than an amount determined as specified under the contractual agreement, said fixed upward adjustment rate and the actual rate of return for a period, an adjusted target rate of return to be credited for an initial period on the ownership interest;
   computing, by said computer using said adjusted target rate of return, an end of period book value equal to a greater one of a market value for the investment or an amount calculated by applying the adjusted target rate of return to the ownership interest in the investment, as specified under the contractual agreement;
   calculating, by said computer using further input and said book value, an initial contingent obligation equal to a difference, if any, between the market value and said book value;
   computing, by said computer using said book value, an amount of contingent obligation for each of a plurality of time periods corresponding to a periodically targeted range of financial protection specified under the contractual agreement, the amount of contingent obligation being variable over said time periods according to the contractual agreement; and
   generating, with said computer, output including the amount of the contingent obligation for at least one of the time periods.

2. A method of using an apparatus, the method including the steps of:
   characterizing an ownership interest in an investment from a group consisting of a variable life insurance policy, a regulated investment company, a publicly traded partnership, a hedge fund, an investment company, and any combination thereof, and an updated average rate of return for the ownership interest in the investment and updated corresponding statistical measure of volatility of the return, as input to a computer;
   calculating, by said computer using said updated average rate of return and said corresponding statistical measure of volatility, an updated target rate and a fixed upward adjustment rate, as specified under a contractual agreement;
   calculating, by said computer using said updated target rate of return and, in the event that an actual rate of return is less than an amount determined as specified under the contractual agreement, said fixed upward adjustment rate and the actual rate of return for a period, an adjusted target rate of return to be credited on the ownership interest;
   computing, by said computer using said adjusted target rate of return, an end of period book value equal to a greater one of a market value for the investment or an amount calculated by applying the adjusted target rate of return to the ownership interest in the investment, as specified under the contractual agreement;
   calculating, by said computer using further input and said book value, a contingent obligation equal to a difference, if any, between the market value and said book value;
   computing, by said computer using said book value, an updated amount of contingent obligation for each of a plurality of time periods corresponding to a periodically targeted range of financial protection specified under the contractual agreement, the amount of contingent obligation being variable over said time periods according to the contractual agreement; and
   generating, with said computer, output including the updated amount of the contingent obligation for at least one of said time periods.

3. A method of using an apparatus, the method including the steps of:
   characterizing an ownership interest in an investment from a group consisting of a variable life insurance policy, a regulated investment company, a publicly traded partnership, a hedge fund, an investment company, and any combination thereof, and an average rate of return for the ownership interest in the investment and corresponding statistical measure of volatility of the return, as input to a computer;
   calculating, by said computer using said average rate of return and said corresponding statistical measure of volatility, a target rate and a fixed upward adjustment rate, as specified under a contractual agreement;
   calculating, by said computer using said target rate of return and, in the event that an actual rate of return is less than an amount determined as specified under the contractual agreement, said fixed upward adjustment rate and the actual rate of return for a period, an adjusted target rate of return to be credited for an initial period on the ownership interest;
   computing, by said computer using said adjusted target rate of return, an end of period book value equal to a greater one of a market value for the investment or an amount calculated by applying the adjusted target rate of return to the ownership interest in the investment, as specified under the contractual agreement;
   calculating, by said computer using further input and said book value, an initial contingent obligation equal to a difference, if any, between the market value and said book value;
   computing, by said computer using said book value, an amount of contingent obligation for each of a plurality of time periods corresponding to a periodically targeted range of financial protection specified under the contractual agreement, the amount of contingent obligation being variable over said time periods according to the contractual agreement; and generating, with said computer, at least one illustration of the amount of the contingent obligation for at least one of said plurality of time periods.

4. A computer-implemented method of using an apparatus, the method including the steps of:

characterizing an ownership interest in an investment from a group consisting of a variable life insurance policy, a regulated investment company, a publicly traded partnership, a hedge fund, an investment company and any combination thereof, and an average rate of return for the ownership interest in the investment and corresponding statistical measure of volatility of the return, as input to a computer;

calculating, by said computer using said average rate of return and said corresponding statistical measure of volatility, a target rate and a fixed upward adjustment rate, as specified under a contractual agreement;

calculating, by said computer using said target rate of return and, in the event that an actual rate of return is less than an amount determined as specified under the contractual agreement, said fixed upward adjustment rate and the actual rate of return for a period, an adjusted target rate of return to be credited on the ownership interest;

computing, by said computer using said adjusted target rate of return, an end of period book value equal to a greater one of a market value for the investment or an amount calculated by applying the adjusted target rate of return to the ownership interest in the investment, as specified under the contractual agreement;

calculating, by said computer using further input and said book value, an amount of contingent obligation for each of a plurality of time periods corresponding to a periodically targeted range of financial protection specified under the contractual agreement, the amount of contingent obligation being variable over said time periods according to the contractual agreement; and generating, with said computer, output including the amount of the contingent obligation for at least one of the time periods.

5. The method of claim 1, further including the steps of:
by computer-to-computer communications, receiving scenario assumptions at the computer; and
generating, with said computer, output including an illustration reflecting an amount of contingent obligation for each of a plurality of time periods corresponding to a periodically targeted range of financial protection specified under said assumptions.

6. The method of claim 3, further including the steps of:
by computer-to-computer communications, receiving scenario assumptions at the computer; and
generating, with said computer, output including an illustration reflecting an amount of contingent obligation for each of a plurality of time periods corresponding to a periodically targeted range of financial protection specified under said assumptions.

7. The method of claim 4, further including the steps of:
by computer-to-computer communications, receiving scenario assumptions at the computer;
generating, with said computer, output including an illustration reflecting an amount of contingent obligation for each of a plurality of time periods corresponding to a periodically targeted range of financial protection specified under said assumptions.

8. A method of using an apparatus, the method including the steps of:

characterizing an ownership interest in an investment from a group consisting of a variable life insurance policy, a regulated investment company, a publicly traded partnership, a hedge fund, an investment company and any combination thereof, and an average rate of return for the ownership interest in the investment and corresponding statistical measure of volatility of the return, as input to a computer;

using said computer and said average rate of return and said corresponding statistical measure of volatility, in calculating a target rate and a fixed upward adjustment rate, as specified under a contractual agreement;

using said computer and said target rate of return and, in the event that an actual rate of return is less than an amount determined as specified under the contractual agreement, said fixed upward adjustment rate and the actual rate of return for a period, calculating an adjusted target rate of return to be credited for an initial period on the ownership interest;

using said computer and said adjusted target rate of return, computing an end of period book value equal to a greater one of a market value for the investment or an amount calculated by applying the adjusted target rate of return to the ownership interest in the investment, as specified under the contractual agreement;

using said computer and further input and said book value, calculating an initial contingent exposure equal to a difference, if any, between the market value and said book value;

using said computer and said book value in computing an amount of contingent exposure for each of a plurality of time periods corresponding to a periodically targeted range of financial protection specified under the contractual agreement, the amount of contingent exposure being variable over said time periods according to the contractual agreement; and generating, with said computer, output including at least one illustration of the amount of contingent exposure for at least one of the time periods.

9. Apparatus comprising:
a computer system adapted to carry out the operations of:
receiving, as input, a characterization of an ownership interest in an investment from a group consisting of a variable life insurance policy, a regulated investment company, a publicly traded partnership, a hedge fund, an investment company, and any combination thereof, and an average rate of return for the ownership interest in the investment and corresponding statistical measure of volatility of the return;

calculating, using said average rate of return and corresponding statistical measure of volatility, a target rate and a fixed upward adjustment rate, as specified under a contractual agreement;

calculating, using said target rate of return and, in the event that an actual rate of return is less than an amount determined as specified under the contractual agreement, said fixed upward adjustment rate and the actual rate of return for a period, an adjusted target rate of return to be credited for an initial period on the ownership interest;

computing, using said adjusted target rate of return, an end of period book value equal to a greater one of a market value for the investment or an amount calculated by applying the adjusted target rate of return to the ownership interest in the investment, as specified under the contractual agreement;

calculating, by said computer using further input and said book value, an initial contingent obligation equal to a difference, if any, between the market value and said book value;

computing, using said book value, an amount of contingent exposure for each of a plurality of time periods corresponding to a periodically targeted range of financial protection specified under the contractual agreement, the amount of contingent exposure being variable over said time periods; and generating, with said computer, output including at least one illustration of the amount of the contingent exposure for at least one of the time periods.

10. Apparatus comprising:

a computer system adapted to carry out the operations of:

receiving, as input, a characterization of an ownership interest in an investment from a group consisting of a variable life insurance policy, a regulated investment company, a publicly traded partnership, a hedge fund, an investment company, and any combination thereof, and an updated average rate of return for the ownership interest in the investment and updated corresponding statistical measure of volatility of the return;

calculating, using said updated average rate of return and said corresponding statistical measure of volatility, an updated target rate and a fixed upward adjustment rate, as specified under a contractual agreement;

calculating, using said updated target rate of return and, in the event that an actual rate of return is less than an amount determined as specified under the contractual agreement, said fixed upward adjustment rate and the actual rate of return for a period, an adjusted target rate of return to be credited on the ownership interest;

computing, using said adjusted target rate of return, an end of period book value equal to a greater one of market value for the investment or an amount calculated by applying the adjusted target rate of return to the ownership interest in the investment, as specified under the contractual agreement;

calculating, using further input and said book value, a contingent exposure equal to a difference, if any, between the market value and said book value;

computing, using said book value, an updated amount of contingent exposure for each of a plurality of time periods corresponding to a periodically targeted range of said financial protection specified under the contractual agreement, the amount of contingent exposure being variable over said time periods according to the contractual agreement; and generating, with said computer, output for said investment in said group, said output including the updated amount of the contingent exposure for at least one of the time periods.

11. Apparatus comprising:

a computer system adapted to carry out the operations of:

characterizing an ownership interest in an investment from a group consisting of a variable life insurance policy, a regulated investment company, a publicly traded partnership, a hedge fund, an investment company, and any combination thereof, and an average rate of return for the ownership interest in the investment and corresponding statistical measure of volatility of the return, as input to a computer;

using said computer and said average rate of return and corresponding statistical measure of volatility, calculating a target rate and a fixed upward adjustment rate, as specified under a contractual agreement;

using said computer and said target rate of return and, in the event that an actual rate of return is less than an amount determined as specified under the contractual agreement, said fixed upward adjustment rate and the actual rate of return for a period, calculating an adjusted target rate of return to be credited for an initial period on the ownership interest;

using said computer and said adjusted target rate of return, computing an end of period book value equal to a greater one of a market value for the investment or an amount calculated by applying the adjusted target rate of return to the ownership interest in the investment, as specified under the contractual agreement;

using said computer and further input and said book value, in calculating an initial contingent exposure;

using said computer and said book value in computing an amount of contingent exposure for each of a plurality of time periods corresponding to a periodically targeted range of financial protection specified under the contractual agreement, the amount of contingent exposure being variable over said time periods according to the contractual agreement; and generating, with said computer, output including at least one illustration of the amount of the contingent exposure for at least one of the time periods.

12. The apparatus of claim 9, further wherein the operations further include:

receiving scenario assumptions at the computer system; and generating output including an illustration reflecting an amount of contingent exposure for each of a plurality of time periods corresponding to a periodically targeted range of financial protection specified under said assumptions; and further including another computer system adapted to carry out the operations of:

receiving said output including the illustration as input in producing an analysis of risk exposure corresponding to said financial protection.

13. The apparatus of claim 11, further wherein the operations further include:

receiving scenario assumptions at the computer; and generating output including an illustration reflecting an amount of contingent exposure for each of a plurality of time periods corresponding to a periodically targeted range of financial protection specified under said assumptions; and further including another computer system adapted to carry out the operations of:

receiving said output including the illustration as input in producing an analysis of risk exposure corresponding to said financial protection.

14. Apparatus comprising:

a computer system adapted to carry out the operations of:

receiving input characterizing an ownership interest in an investment from a group consisting of a variable life insurance policy, a regulated investment company, a publicly traded partnership, a hedge fund, an investment company, and any combination thereof, and an average rate of return for the ownership interest in the investment and corresponding statistical measure of volatility of the return;

using said average rate of return and said corresponding statistical measure of volatility in calculating a target rate and a fixed upward adjustment rate, as specified under a contractual agreement;

using said computer and said target rate of return and, in the event that an actual rate of return is less than an amount determined as specified under the contractual agreement, said fixed upward adjustment rate and the actual rate of return for a period, calculating an adjusted target rate of return to be credited on the ownership interest;

using said computer and said adjusted target rate of return, computing an end of period book value equal to a greater one of a market value for the investment or an amount calculated by applying the adjusted target rate of return to the ownership interest in the investment, as specified under the contractual agreement;

using said computer and said book value in computing an amount of contingent exposure for each of a plurality of time periods corresponding to a periodically targeted range of financial protection specified under the contractual agreement, the amount of contingent exposure being variable over said time periods according to the contractual agreement; and generating output including at least one illustration of the amount of the contingent exposure for at least one of the time periods.

15. The method of any one of claims 8, wherein characterizing step is carried out with the investment consisting of a variable life insurance policy.

16. The method of any one of claims 8, wherein characterizing step is carried out with the investment consisting of a regulated investment company.

17. The method of any one of claims 8, wherein characterizing step is carried out with the investment consisting of a publicly traded partnership.

18. The method of any one of claims 8, wherein characterizing step is carried out with the investment consisting of a hedge fund.

19. The method of any one of claims 8, wherein characterizing step is carried out with the investment consisting of an investment company.

20. The method of any one of claims 8, wherein characterizing step is carried out with the investment consisting of a combination of a variable life insurance policy, a regulated investment company, a publicly traded partnership, a hedge fund, and an investment company.

21. The apparatus of any one of claims 14, wherein the investment consists of a variable life insurance policy.

22. The apparatus of any one of claims 14, wherein the investment consists a regulated investment company.

23. The apparatus of any one of claims 14, wherein the investment consists a publicly traded partnership.

24. The apparatus of any one of claims 14, wherein the investment consists a hedge fund.

25. The apparatus of any one of claims 14, wherein the investment consists an investment company.

26. The apparatus of any one of claims 14, wherein the investment consists a combination of a variable life insurance policy, a regulated investment company, a publicly traded partnership, a hedge fund, and an investment company.

27. The method of any one of claims 8, wherein characterizing step is carried out with the average rate of return being the mean rate of return.

28. The method of any one of claims 8, wherein characterizing step is carried out with the corresponding statistical measure of volatility being the standard deviation.

* * * * *